United States Patent [19]

Friedel, Jr. et al.

[11] 3,942,590

[45] Mar. 9, 1976

[54] TOMATO HARVESTER

[75] Inventors: William C. Friedel, Jr.; Charles F. Dietz, both of Rio Vista; Lowell K. Marshall, Sacramento, all of Calif.

[73] Assignee: The Regents of the University of California, Berkeley, Calif.

[22] Filed: May 25, 1973

[21] Appl. No.: 364,047

[52] U.S. Cl. .......................... 171/5; 171/9; 171/18; 171/27
[51] Int. Cl.² ........................................ A01D 17/00
[58] Field of Search ............. 116/114 R, 128; 35/11; 40/129 C; 180/90, 77 R; 296/21, 70; 171/101, 18, 5, 48, 27, 61, 9; 56/229, 10.2

[56] References Cited
UNITED STATES PATENTS

| | | | |
|---|---|---|---|
| 3,286,774 | 11/1966 | Lorenzen et al. | 171/27 |
| 3,340,935 | 9/1967 | Csimma | 171/27 |
| 3,613,796 | 10/1971 | Cayton | 171/27 |
| 3,616,821 | 11/1971 | Bettencourt | 171/101 |
| 3,628,609 | 12/1971 | Graybill | 171/27 |
| 3,721,301 | 3/1973 | Weasel et al. | 171/61 |

OTHER PUBLICATIONS

Volkswagen Owner's Manual–1969 Models, Title page and pp. 8 and 9.

Primary Examiner—Louis G. Mancene
Assistant Examiner—James D. Hamilton
Attorney, Agent, or Firm—Owen, Wickersham & Erickson

[57] ABSTRACT

A tomato harvester with improved maneuverability and versatility. An improved spinner gives better action in wet soil. The driver obtains improved visibility from an improved canopy structure and is given controls that are easier to identify. An improved collecting conveyor affords balance between the two sides. The conveyor system is improved, in many ways, with better transmission between the conveyors and better access to cleaning. An improved output conveyor and drop loader are also provided.

2 Claims, 23 Drawing Figures

FIG_4

FIG_5

FIG_6

FIG_7

FIG_8

FIG_9

FIG_10

FIG_12

FIG_11

FIG_13

FIG_14

FIG_15

FIG_16

FIG_21

FIG_20

FIG_22

FIG_23

TOMATO HARVESTER

BACKGROUND OF THE INVENTION

This invention relates to an improved tomato harvester.

There has been a demand for tomato harvesters with very large production capabilities. There have also been demands for tomato harvesters that could be used in situations more difficult than those for which they were originally designed—for example, for increased use where soils are liable to be wet or even muddy during harvest time, and without having to wait until they dry. There is also need for increased versatility, depending on various planting bed widths and various planting conditions of different moisture and field structure.

The conditions call for improvements in the location and adjustment of location of the colter discs and gauge wheels, and provision of an improved spinner for getting rid of mud. The former spinner, though very good, has tended to become plugged with mud during use.

The collecting conveyors have tended to catch and retain mud and debris, apparently partly because of their rigidity.

The conveyor system as a whole has called for improvement, having depended for some time on a cooperation with various aspects of the machine, and as a result having somewhat a tendency to pack the fruit into substantially a single row along the rear cross conveyor, which, it was believed, had to slope. Sorter conveyors have been hard to clean, and the guards for the cull chutes have hampered the cleaning of the remainder of the machine. There have been needs for providing room for a larger number of sorters and for new sorting positions.

The control of the machine by the operator has been difficult. Attempts have been made to have two men control the machine, one being a field manager and the other a driver, but this has proved to be impractical. It is generally desired to have control by a single man. Also, it has sometimes been difficult for this man to identify all the many controls that are needed, particularly when the man is illiterate or is not fluent in the language with which the machine is labeled. The view of the driver has also been obstructed at certain places by the canopy which shades the machine and the people working thereon.

In transferring the harvested and sorted crop to bins or trucks which are moving through the field, there have been problems in getting the output conveyor to operate at sufficient speed, to have its speed adjustable relative to the other conveyors, and to get this output conveyor to carry off a very large volume of fruit. Similarly, the final drop loaders have been limited by basic features of their construction in the amount of fruit that they could handle.

The present invention is directed to improvement along the lines described above. It solves a number of problems concerned with tomato harvesting and provides improved quality of operation as well as improvement in the quantity of tomatoes that can be handled and the general rapidity of operations.

SUMMARY OF THE INVENTION

The problems relating to the gauge wheels and colters have been solved by mounting the gauge wheels on casters and by providing two parallel front bars extending widthwise across the machine, on either of which the gauge wheels and colter discs can be mounted. Sometimes both are mounted on one bar, sometimes on another, and sometimes they are mounted on different bars. Three different positions relative to the fore-and-aft aspect of the machine are provided for each of them, and the wheels and colter discs can be moved inwardly of the machine towards each other to accommodate various sizes of rows.

The spinner has been improved by molding it in one integral piece and molding it around a shaft. This improved spinner is more efficient, and mud and dirt, which get into recesses between the blades, tend to fall out, since these recesses are smoothly curved and do not have portions which enable the dirt or mud to anchor itself to the spinner and then build up. Smooth radii cause the dirt and mud to tend to drop off and make it much less likely that they will hang on.

The improved conveyor system includes a collecting conveyor mounted to each of two chains. The two sides of the chain are separately driven by separate hydraulic motors, which are in series and which move at the same rate. Provisions are made so that if either motor stalls, a return of fluid to the reservoir by a bypass arrangement actuates a diaphragm that sounds an audible warning, so that the driver can stop at once and remedy the difficulty.

Other conveyor system improvements include a pair of flat rear end cross conveyors, which receive the fruit from the collecting conveyor and go in two opposite directions to drop the fruit off directly onto the two sorter conveyors, and it will be seen that this structure gives more sorting span and more capacity. The sorter conveyors themselves have protective strips at each side that prevent damage to fruit at the edges, and the side cull chutes along the outer edge are made so that their guard plates can be easily lifted out for accessibility to the lower part of the harvester for cleaning or repair. Moreover, increased sorting room is provided along the main sorter conveyors, while in addition, an additional sorter platform on each side of the front of the machine is provided with its own cull chute. These additional sorter platforms also serve as steps to a driver platform, which goes all the way across the machine and gives the driver the opportunity to move himself rapidly in either direction.

The driver is further assisted by controls which are labelled in such a manner that he does not need to read any particular language or to rely on memory, but can tell from suitable symbols exactly what the controls are doing. Moreover, his ability to see the output end of the output conveyor is helped by providing a cutout portion of the canopy which is used under very sunny conditions, so that he can see the drop loader while the canopy is in place.

The loading or output conveyor is made very light and has an increased depth with deep flight bars enabling the stacking of a plurality of layers of tomatoes on each flight area. The loading conveyor is driven separately, and its speed is separately adjustable. Due to the increased capacity, the speed can be slower than the other conveyors to impart a more gentle movement of the fruit.

Finally, an improved drop loader is provided, which is rectangular, having a series of tapered resilient fingers that are mounted at an improved angle to extend in a direction giving them capabilities for handling large amounts of fruit very gently.

Other objects and advantages of the invention will appear from the following description of a preferred embodiment.

DESCRIPTION OF A PREFERRED EMBODIMENT

Figure 1:
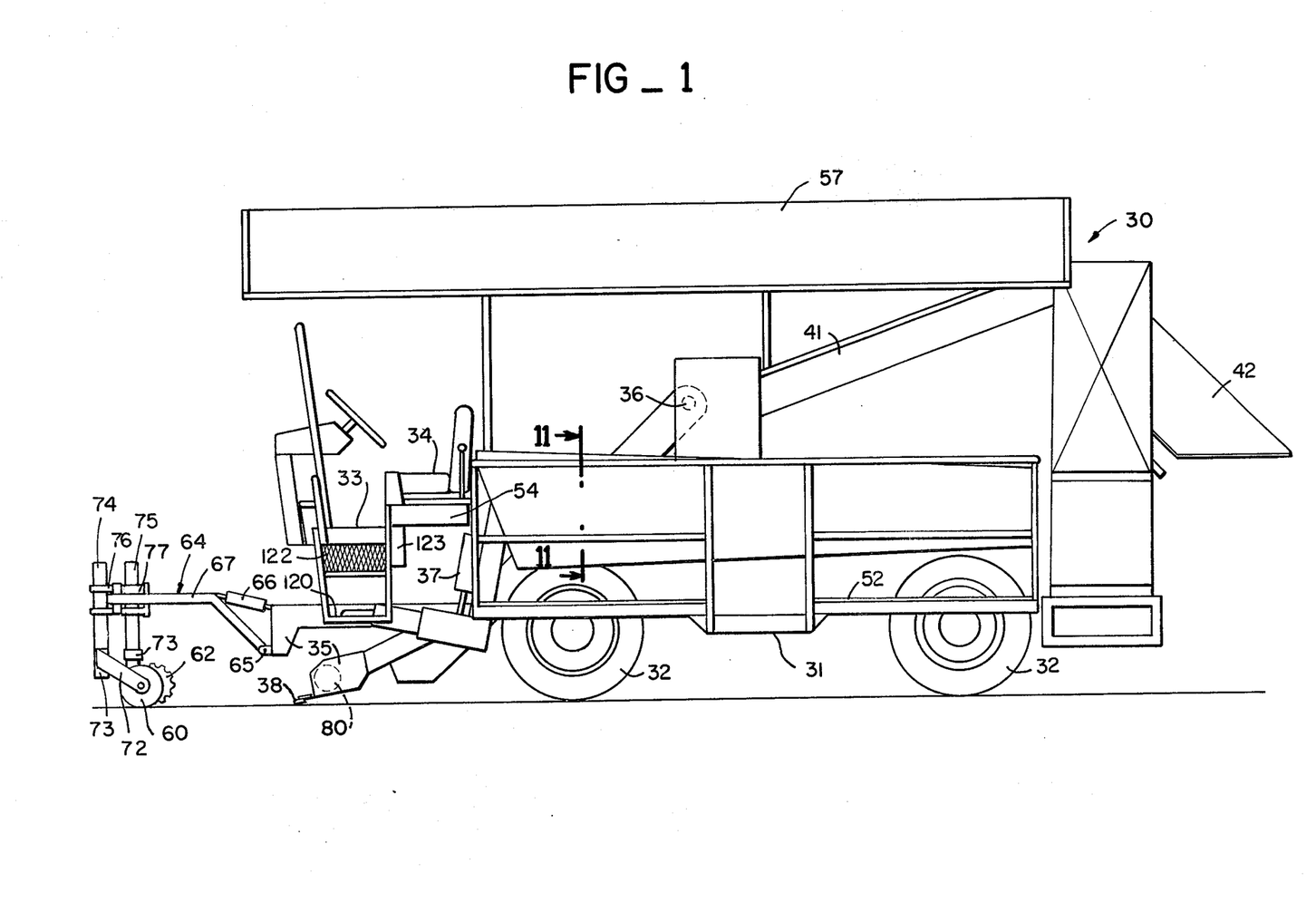
FIG. 1 is a view in side elevation of a tomato harvester embodying the principles of the invention.
Figure 2:
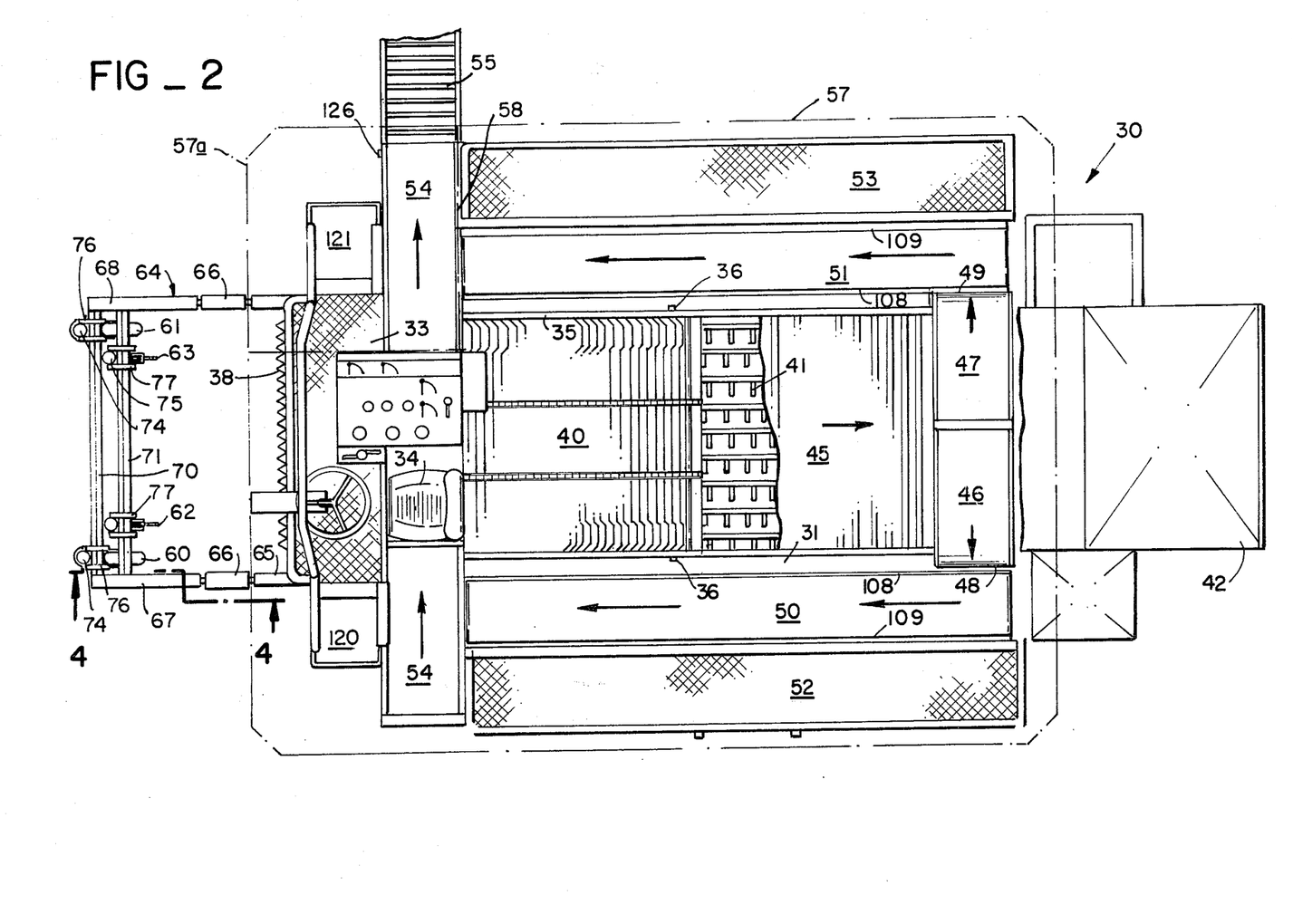
FIG. 2 is a top plan view of the tomato harvester of FIG. 1, with the canopy shown only in dot-dash lines and with most of the separator removed to show the collecting conveyor below, since the separator remains the same as in previous machines of this type. Arrows indicate the flow of fruit along the main conveyor system. The output conveyor is broken off in order to conserve space.
Figure 3:
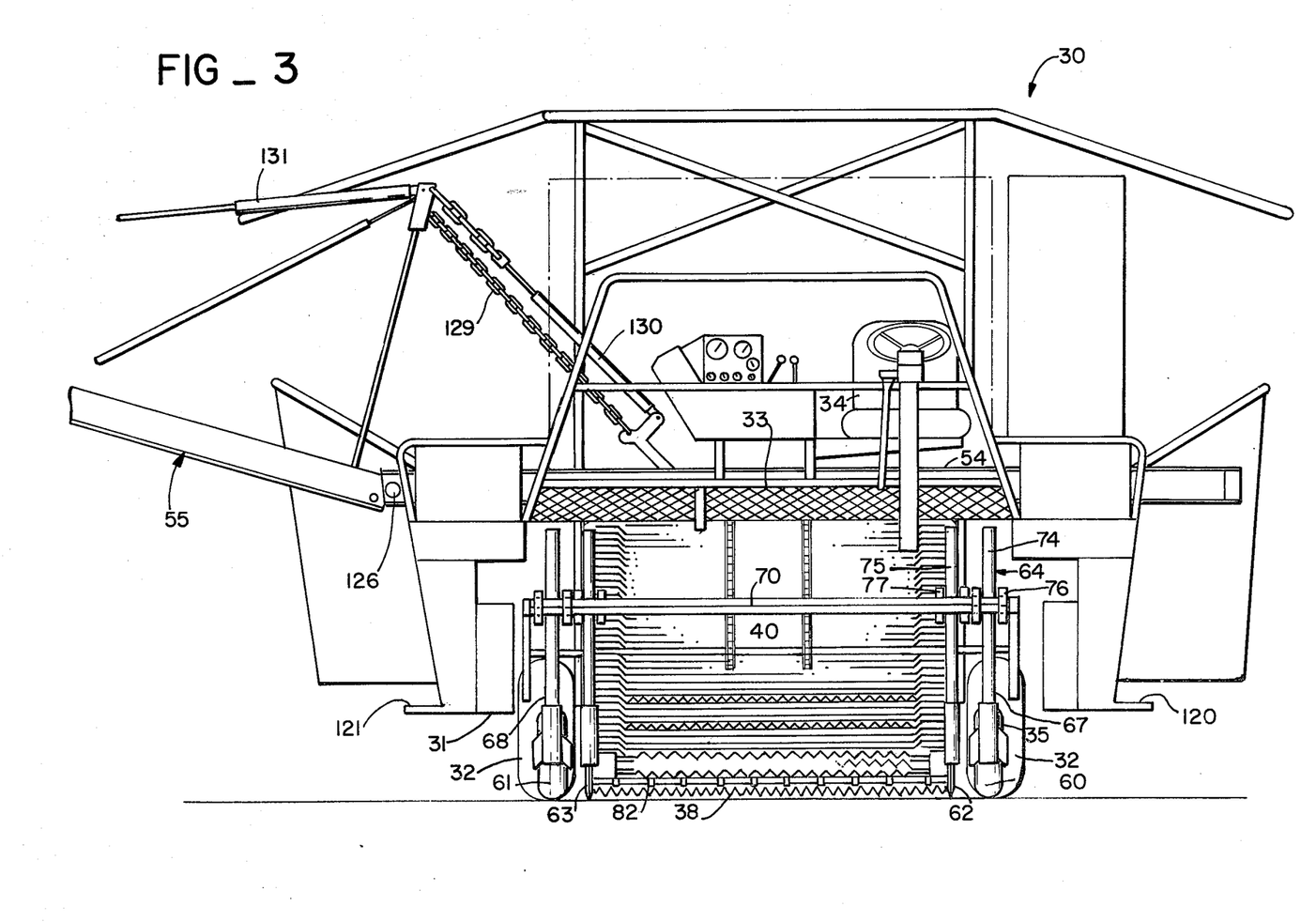
FIG. 3 is a view in front elevation of the machine of FIGS. 1 and 2 with the output conveyor again broken off in order to conserve space.

Overall brief description of the harvester 30 (FIGS. 1–3)

FIGS. 1, 2, and 3 give a general overall impression of a harvester embodying the principles of the invention. Generally, it operates along the lines of the various machines patented in the United States, by the University of California. It involves the cutting off of tomato vines, the elevation of the vines to a separation zone, separation there by shaking action, the collecting of the shaken-off tomatoes and disposal of the vines, the conveying of the collected tomatoes past sorting stations where they are sorted and culls are removed, and the transfer of the selected tomatoes to an output conveyor which transfers them via a drop loader to bins moved through the field parallel to the harvester. The invention has improved the operation in many ways, but the overall system of operation remains in principle substantially the same.

Thus, a machine 30 embodying the principles of the invention is provided with a main frame 31 which supports all the elements of the machine. The frame 31 is carried on wheels 32 and is provided with an operator's platform 33 with a seat 34 for him. Near the front end of the frame 31 an elevator frame 35 is pivotally supported on pivots 36. Hydraulic cylinders 37 mounted between the main frame 31 and the elevator frame 35 enable the front end of the frame 35 to be lifted and lowered. The forward end of the frame 35 carries a knife or cutter bar 38, which severs the vines, usually below the level of the soil. From there, the cut tomato vines are elevated by an elevator 40, which may be like that shown in the U.S. patent to Gates et al, U.S. Pat. No. 3,436,902, or like that shown in the U.S. patent to Bettencourt, U.S. Pat. No. 3,616,861. The elevator 40 transfers them to a separation zone 41, indicated only broadly, where the tomatoes are shaken from the vines by a shaker as shown in the U.S. patent to Hill et al, U.S. Pat. No. 3,252,464, or in the U.S. patent to Hill, U.S. Pat. No. 3,455,453. The vines are dropped off onto the field again through a disposal chute 42, while the tomatoes are collected on a collecting conveyor 45. The tomatoes drop from the rear end of the collecting conveyor 45 on to rear end cross conveyors 46 and 47 which lead to sorting conveyors 50 and 51, beside which are sorter platforms 52 and 53. The sorting conveyors 50 and 51 in turn deposit the sorted fruit on a front end cross conveyor 54 which leads to an output conveyor 55 which, via a drop chute 56, transfers the fruit to a large bin moved parallel to the harvester 30.

The gauge wheels 60, 61 and colter discs 62, 63 (FIGS. 1–6)

In the present invention, the first improvement to be described is that of the mounting of the two gauge wheels 60 and 61 and the two colter discs 62 and 63. This is provided by a sub-frame 64 pivoted by horizontal lateral pivots 65 to the elevator frame 35 and elevated when the main cylinders 38 lift the elevator frame 35 and also elevated relatively to the elevator frame 35 by auxiliary cylinders 66 between the sub-frame 64 and the elevator frame 35.

Figure 4:
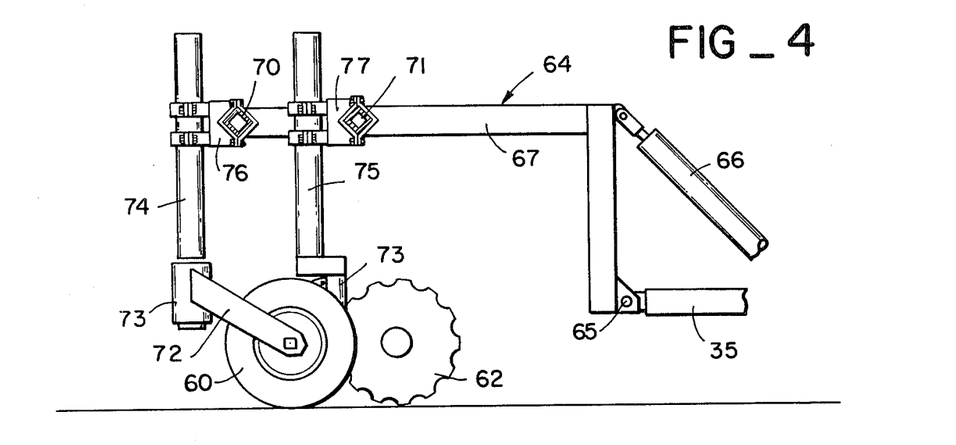
FIG. 4 is an enlarged fragmentary view in side elevation and in section taken along the lines 4—4 in FIG. 2 and showing the two parallel bars on which the colter discs and gauge wheels are mounted, along with a portion of the lifting cylinder controlling this sub-frame.
Figure 5:
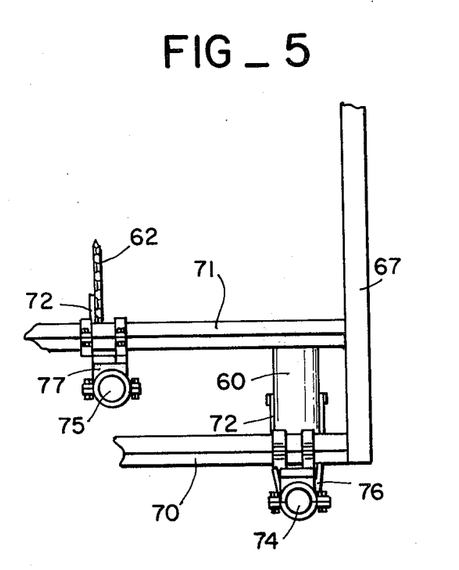
FIG. 5 is a fragmentary top plan view of a portion of FIG. 4.
Figure 6:
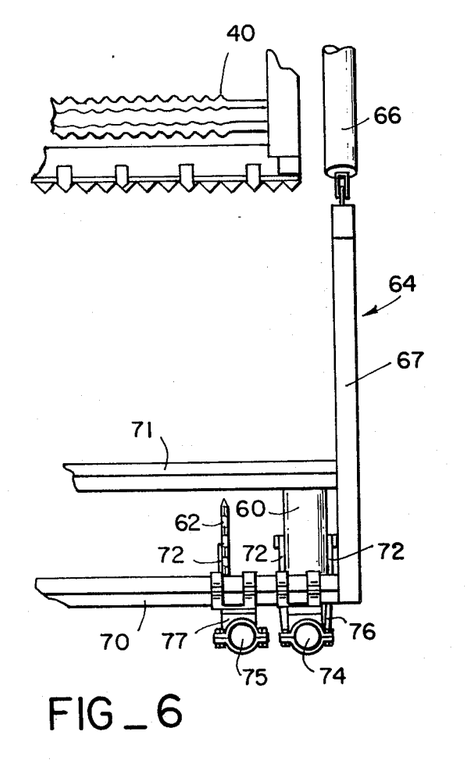
FIG. 6 is a similar view with the wheel and disc mounted in different positions, and showing a portion of the cutting bar, spinner and front elevator.

The frame 64 comprises two longitudinally-extending side members 67 and 68 which support two parallel front bars 70 and 71. The two bars 70 and 71, as can be seen in FIGS. 4 through 6, may be at the same level and may be square so as to give a keying action to prevent unwanted rotation of the members clamped thereon. The colter discs 62 and 63 and the gauge wheels 60 and 61 are both mounted by swivel arms 72 to a sleeve 73 that swivels on a vertical shaft 74 or 75 in a caster type construction, so that the wheels 60 and 61 and discs 62 and 63 will always trail this vertical shaft 74 or 75. The vertical shafts 74 and 75 extend up to a double-sleeve clamping device 76 or 77, which is also clamped to one of the parallel bars 70 or 71. Thus, the clamping mechanisms 76 and 77 can be clamped to either the front bar 70 or the rear bar 71 and hold the wheel 60 or 61 or the disc 62 or 63 so that it either leads or trails the bar 70 or 71 to which it is clamped, giving a variety of positions there. The gauge wheel 60 and colter disc 62 can be held by the same cross bar 70, as shown in FIG. 6, and they can be on different bars 70 and 71 as shown in FIGS. 4 and 5. Moreover, the clamps 76 and 77 can be moved laterally of the machine, along the bars 70 or 71, to accommodate the different sizes of planting beds and so that they can be made to lie exactly where desired for the particular field being harvested.

The versatility provided by this construction is quite important and adds greatly to the versatility of the machine and to its adaptability to different styles of tomato cultivation.

Figure 7:
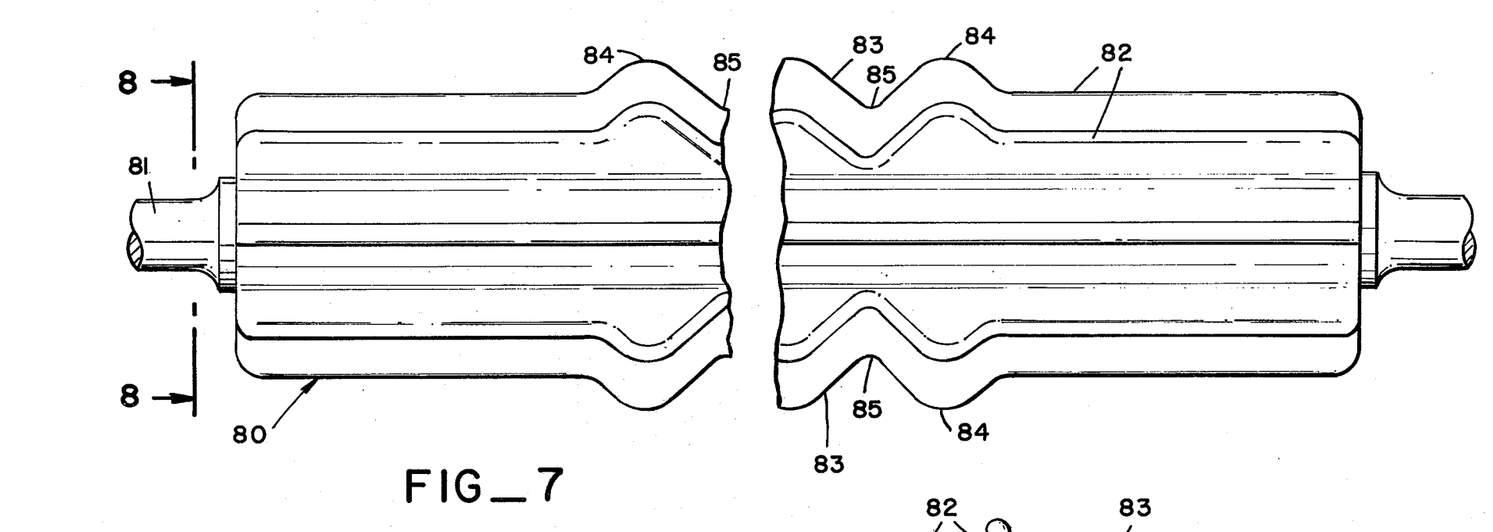
FIG. 7 is an enlarged view of a portion of the spinner, broken in the middle in order to conserve space.
Figure 8:
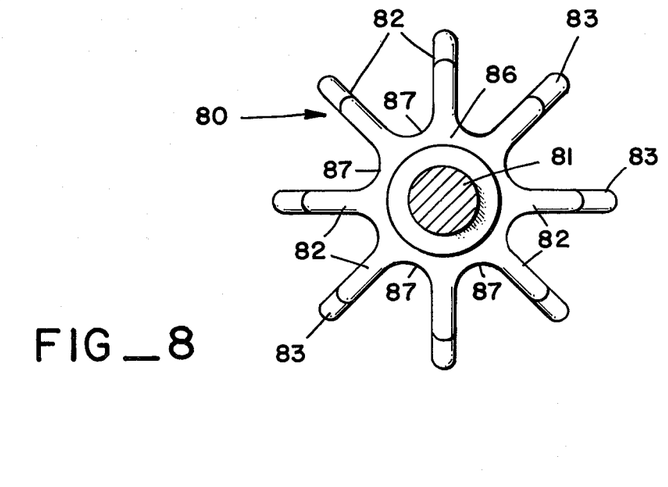
FIG. 8 is a view in section taken along the line 8—8 in FIG. 7.

The spinner 80 (FIGS. 6–8)

The pick-up for the harvester 30 is provided with a spinner 80 supported by the elevator frame 35 above and near the cutter bar 37, just to the rear thereof. The purpose of this spinner is to help in harvesting particularly under moist conditions. It is an improvement over the spinner shown in the U.S. patent to Bettencourt U.S. Pat. No. 3,616,861. The spinner of that invention was very helpful in enabling harvesting under different conditions, but it did have the disadvantage that various recesses and corners and gaps between blades tended to collect mud and allow the mud to build up gradually, so that operation had to sometimes stop for cleaning off the bar or so that the spinner was in effect really doing no good whatever, becoming eventually essentially a solid cylinder of mud.

The present invention has solved this problem by the spinner 80, which is molded as a unitary member around a shaft 81. This unitary spinner may be made from a polyurethane elastomer which provides flexibility with great strength. Although that material is somewhat low in tear strength, the smooth molding minimizes that disadvantage. The spinner 80 provides a series of flat paddles or vanes 82, for example, eight are shown in the embodiment of FIGS. 7 and 8, each of which has a serrated edge 83. The serrations are smoothly curved to avoid sharp edges having radius turns 84 and 85 at the changes of direction, which help to keep mud from clinging to them. The vanes or paddles 82 extend out in respective radial planes from a central generally cylindrical core 86, and each vane 82 is connected to the next adjacent one by a smoothly curved radius portion 87. The smooth curves prevent the build up of mud, since mud is always able to slide off the smooth curved portions, especially as the vanes 82 flex during rotation. The spinner 80 is driven in substantially the same manner as in that shown in the earlier patent, but it operates in a superior manner by virtue of its structure.

Figure 9:
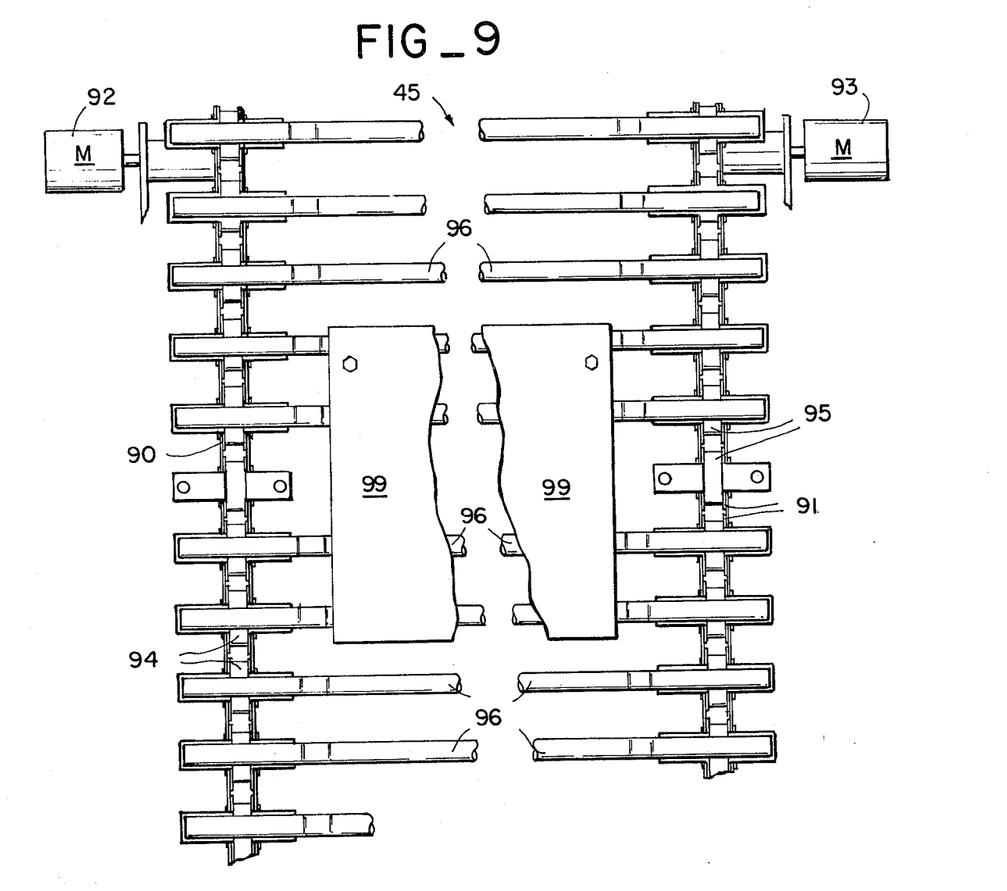
FIG. 9 is a top plan view of a portion of the collecting conveyor broken in the middle to conserve space and also broken at one end for the same reason, and showing the location of the hydraulic drive motors.
Figure 10:
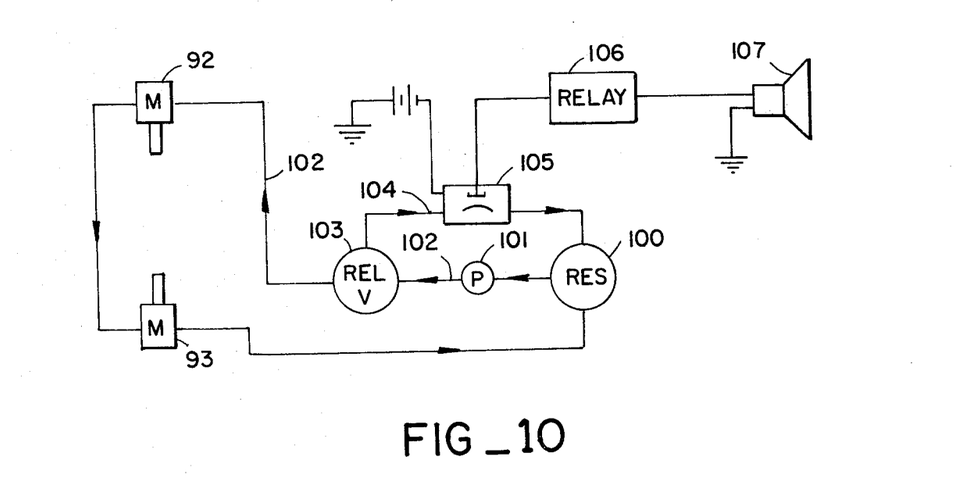
FIG. 10 is an hydraulic circuit diagram of the motors and valves and showing the audible warning system.

The collecting conveyor 45 (FIGS. 1, 9, and 10)

The collecting conveyor 45 is provided by two parallel chains 90 and 91, each driven by a separate hydraulic motor 92, 93 and each having a series of links 94 and 95, each having a socket therein. Between the chains 90 and 91 and secured to them is a series of cylindrical rods 96 bent to recess between chains and consequently to tend to free themselves from dirt at the turns connecting the upper and lower flights. The two chains 90 and 91 are kept substantially parallel. A flap 99 is used for freeing debris caught between the upper and lower flights of the conveyor, as explained in an earlier issued patent.

Due to the separate drives for the separate chains 90 and 91, which is quite efficient, a problem arises which was not present in earlier tomato harvesters. In earlier tomato harvesters, when the collecting conveyor was driven from the main drive system, any hang up in the conveyor was instantly sensed by the driver. This would not be so in the present invention. Therefore, a special warning system is provided. The two motors 92 and 93 are driven in series by the same hydraulic system and at the same speed. There may be a reservoir 100, a pump 101 and a conduit 102. If for any reasons resistance is met, or if one of the motors 92 or 93 stops or slows so that they should move at different speeds, this bypasses fluid via a relief valve 103 to a bypass conduit 104. In the bypass conduit 104 is a diaphragm unit 105, and when pressure builds up, it actuates the diaphragm 105 to close a relay 106 that sounds a horn 107, calling the driver's attention to the problem. He can then stop the machine instantly and take care of the difficulty. Other types of alarm device may be used in place of the horn 107.

The rear end cross conveyors 46 and 47 (FIG. 2)

The rear end cross conveyors 46 and 47 are, contrary to those shown in the Gates et al U.S. Pat. No. 3,422,953, flat rather than tilted. This helps to distribute the tomatoes better along the conveyors 46 and 47 rather than causing them to bunch up in one place toward the front edge. Moreover, the rear end cross conveyors 46 and 47 drop the tomatoes off directly from their ends 48 and 49 at the inside edges 108 of the sorter conveyors 50 and 51. This also has been found to help to distribute the fruit better along the sorter conveyors and avoids fruit damage from scrapers which were relied on before to more or less rake off the fruit from one conveyor to the other.

Another feature of the invention is the fact that by shortening the length of the rear-cross-conveyors 44 and 47 so that they end at the inside edge 108 of the sorter conveyors 50 and 52, there is enough space for another sorter to stand opposite the rear-cross-conveyor and he will receive a substantial amount of fruit, whereas in the former structures there was insufficient room here for a person to stand, or if he did stand there, he would not get enough fruit and would not be able to work full time.

The main sorter conveyors 50 and 51 and the cull guards 113 (FIGS. 1–3 and 11–13)

Each sorter conveyor 50, 51 is provided with protective strips 110 (see FIGS. 11–13) at each side edge 108 and 109. These strips curve down and slightly overlie the conveyor. The strips 110 are made of soft flexible material such as elastomer and do not cause sufficient friction to slow down or drag on the sorter conveyors 50 and 51, but at the same time they prevent damage to fruit at the edges 108 and 109 of the conveyors 50 and 51, which tends to occur when the edges 108 and 109 are left bare. These strips 110 are mounted immovably to side walls 111.

Figure 11:
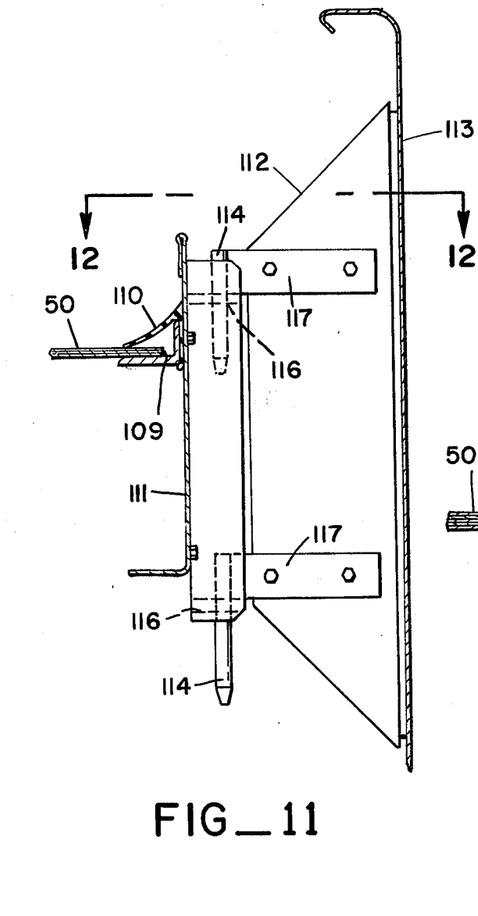
FIG. 11 is an enlarged fragmentary view taken along the line 11—11 in FIG. 1 and showing a portion of the side conveyor and cull chute.
Figure 12:
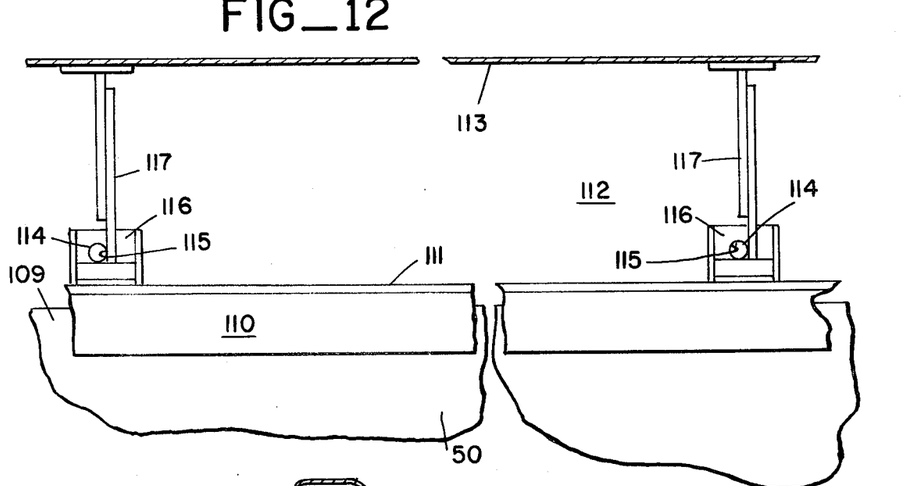
FIG. 12 is a view in section taken along the line 12—12 in FIG. 11.
Figure 13:
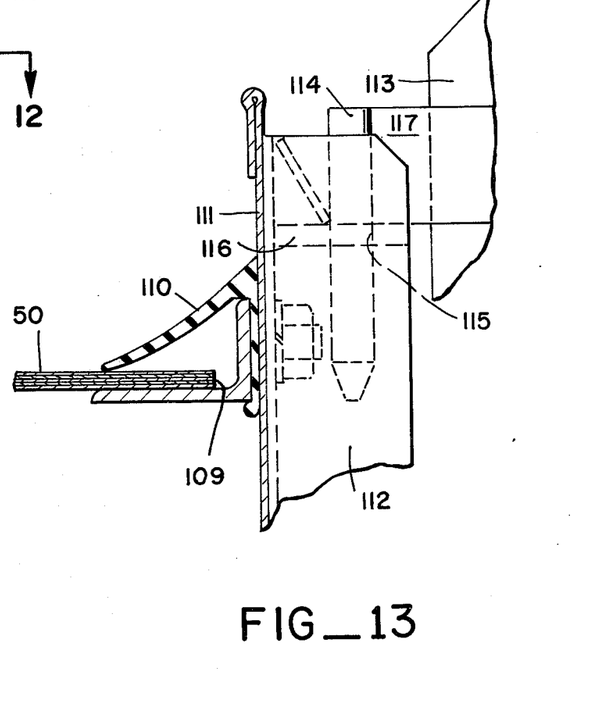
FIG. 13 is an enlarged portion of a portion of FIG. 11.

As in prior sorter conveyors, it is necessary to provide a system for getting rid of the culls, and therefore cull chutes 112 are provided, by guide plates 113 spaced away from the walls 111 toward the platforms 52 and 53. A difficulty of these has been that if the machine is to be relatively compact, the cull chute guards 113 get in the way of access to the lower parts of the harvester and hinder cleaning or repair. In the present invention these cull chute guards 113 are made removable. Each one of them is provided with male brackets 117 bolted to the chute guards 113, each bracket having a pin 114 which slips down into an opening 115 in a horizontal female bracket 116 which is bolted to the wall 111 or some member of the frame 31. The pins 114 are held in place by gravity and are extracted simply by lifting up the guards 113. The guards 113 may be made in series or there may be only one along each side for this purpose. In between the wall 111 and the guard 113 are the chutes 112 through which the culls can be dropped as easily as before by the sorters.

Front cross conveyor 54 and auxiliary sorting stations 120 and 121 (FIGS. 1–3 and 14–16)

Figure 14:
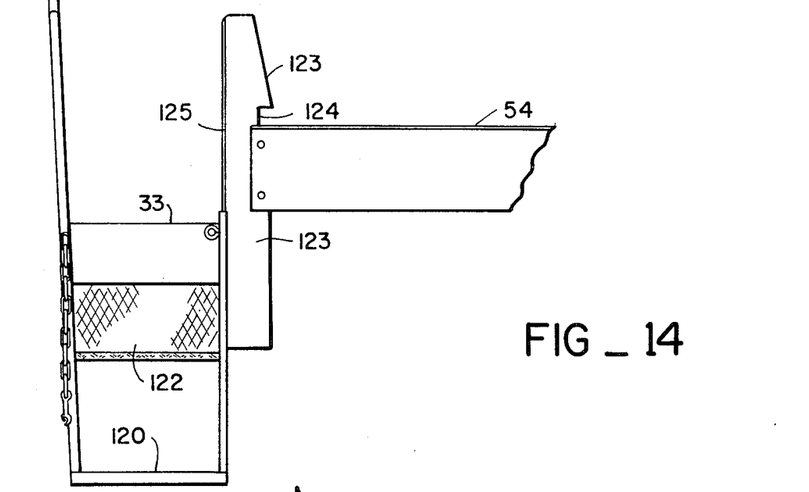
FIG. 14 is a view in side elevation of one of the extra end sorting stands, adjacent the driver's platform, shown in elevation, and serving also as a step up to the driver's platform.
Figures 15, 16:
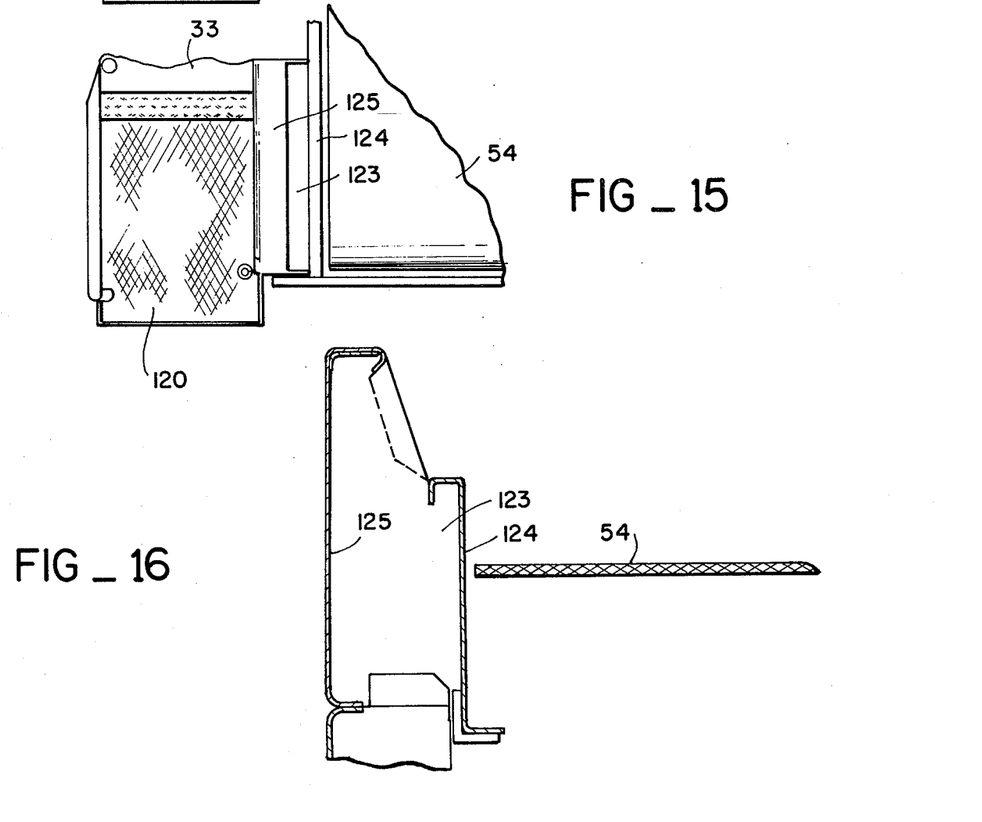
FIG. 15 is a fragmentary top plan view of the same.
FIG. 16 is a view in section taken along the line 16—16 in FIG. 15, showing also a portion of the cull chute for this sorter platform.
Figure 17:
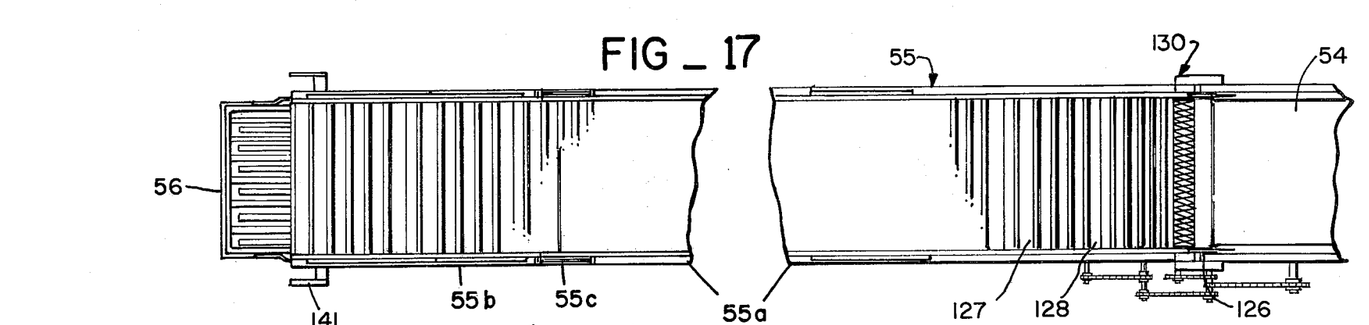
FIG. 17 is a top plan view of the output conveyor, which is attached to the main frame and extends out to a drop-loading conveyor. The view has been broken in the middle in order to conserve space.
Figures 18, 19:
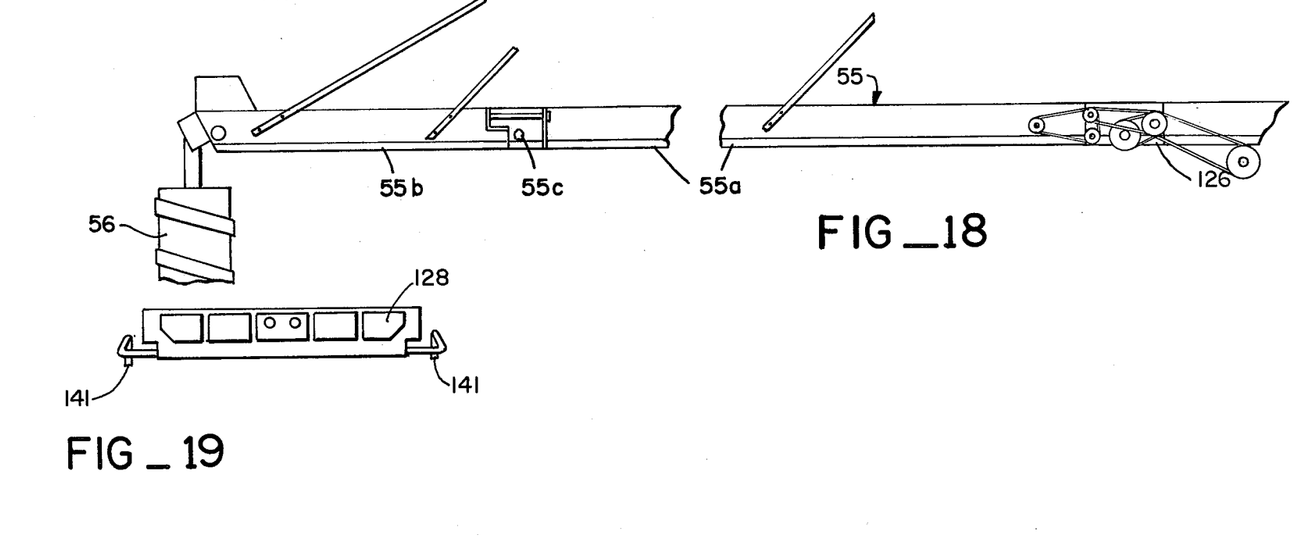
FIG. 18 is a similar view in side elevation, also broken in the middle.
FIG. 19 is a view in end elevation of one flight bar of the output conveyor.

A further innovation is the provision of two sorter platforms 120 and 121 in front of the machine, one on each side of the driver's platform 33. The driver's platform 33 is made to continue across the space between the platforms 120 and 121 rather than being located at one side only of the harvester, and this structure gives the driver the advantage of being able to get to either side of the machine quickly and even at times during operation, if that is necessary, using the platforms 120 and 121 as steps.

Each of these sorting platforms 120 and 121 faces the front cross conveyor 54 and enables a final sorting operation at this stage, one sorter facing each of the outlets from the two main sorting conveyors 50 and 51; and, of course, the man at the station 121 nearest the output conveyor 55 can also check the sorter at the station 120, if desired. Each sorting platform 120, 121 is comprised of the usual floor base, has a safety guard 122, and has a cull chute 123 provided between a wall 124 bordering the front cross conveyor 54 and a guard plate 125.

The output conveyor 55 (FIGS. 2, 3 and 17–19)

The output conveyor 55 extends out to one side of the main frame 31, to which it is pivoted at a pivot 126. It is made of aluminum except for drive chains alongside a conveyor chain 127. The chain 127 is provided about every fifth link with deep flight bars 128 which enable stacking two or more layers of tomatoes in each flight pocket that lies between succeeding bars 128. With the increased capacity resulting from this, it becomes possible to move the drive chains more slowly so that the fruit can be dropped off more gently at the outboard end, and they do not have the long inertial trajectory which would otherwise be present. By having the output conveyor 55 move at a speed much slower than that of the other conveyors 54, etc., it is possible to prevent damage to tomatoes that have in the past occurred at the input and outboard ends of the output conveyor 55. Hydraulic cylinders 130 and 131 are provided for raising and lowering separately the two sections 55a and 55b of the conveyor 55 about the pivot 55c, and there is a positioning and safety chain 129 (see FIG. 3). This adjustable dogleg conveyor 55 is, in one unit, an elevator and a "lowervator" with the drop loader 56 or decelerator at its outer end.

The drive for all the conveyors can be from the main drive or can be from a separate hydraulic drive. In any event, separate regulation is easily obtainable.

To shade the sorters, the harvester has a canopy 57 generally like that shown in the U.S. patent to Snook, U.S. Pat. No. 3,455,311. However, that canopy tended to cut off the driver's view of the outboard end of the output conveyor 55, so that the driver had difficulty controlling the location of the drop loader 56. Hence, the canopy 57 of this invention has a cutout portion 58 which enables the driver to see the output conveyor 55 without obstruction. This may be as shown in FIGS. 2 and 3.

The drop loader (FIGS. 17–19 and 20–22)

Figure 20:
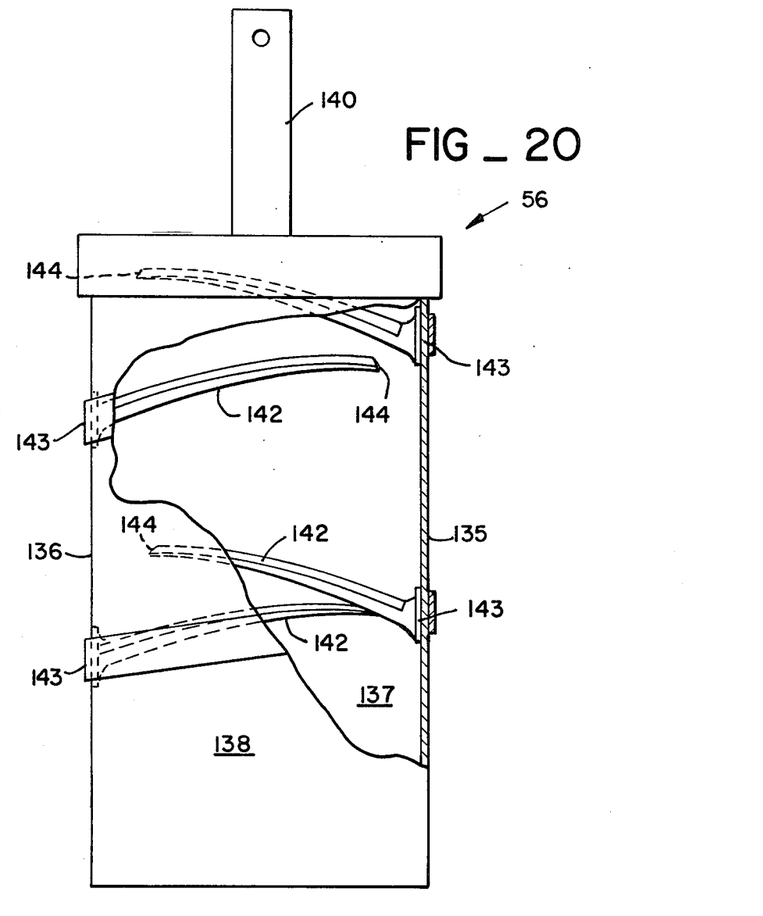
FIG. 20 is a view in side elevation and partly in section of the drop loader.
Figure 21:
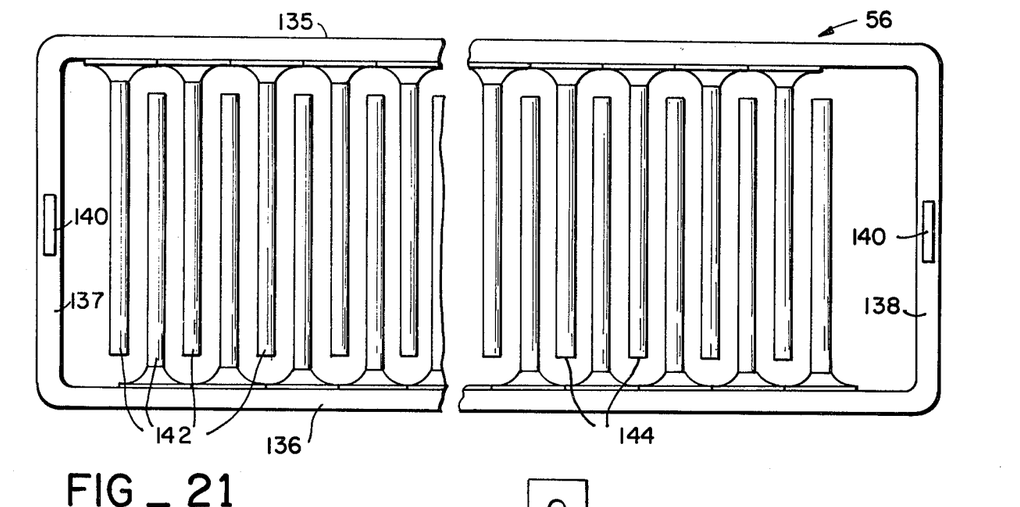
FIG. 21 is a top plan view of the same with a portion broken away to conserve space.

At the outboard end of the loading conveyor 55 is the final drop loader 56. This device comprises a rectangular enclosure open at top and bottom with parallel walls 135 and 136 extending along the full width of the loading conveyor 56 and joined together by walls 137 and 138 wide enough to be sure that all the tomatoes dropping off the conveyor 55 enter the loader 56. Brackets 140 suspend it from hangers 141 on the conveyor 55.

Figure 22:
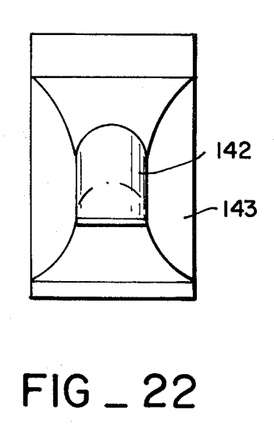
FIG. 22 is an enlarged view in end elevation of one of the fingers of FIGS. 20 and 21.

Fingers 142 are mounted to the walls 135 and 136. These fingers 142 are tapered so that they will flex at every location. It has been found that fingers that are made with substantially constant dimensions tend to bend only at one point, and therefore are not able to handle large quantities of fruits and so confine the distribution down to just one portion of the drop loader. By having the fingers 142 smoothly tapered from their base end 143 to their outboard end 144, this is avoided; and they can bend at any point to pressure from above. Moreover, each finger 142 is mounted to extend upward from its base 143 at an angle such that their inherent sag brings their outer ends 144 about level with the base 143. This angle is typically about 15°, which gives the proper flexure from their own weight. If they were mounted to extend out horizontally, they would be unable to flex properly and instead would all hang downwardly. This means that they start off pointing upwardly and then smoothly curve over and can give at any point. Some rows of fingers 142 extend from the wall 135 of the device and some from the opposite wall 136, and the rows face each other and are staggered in between by being based at different heights; by being staggered, they provide a very sure deceleration of the tomatoes as they drop through the device.

Figure 23:
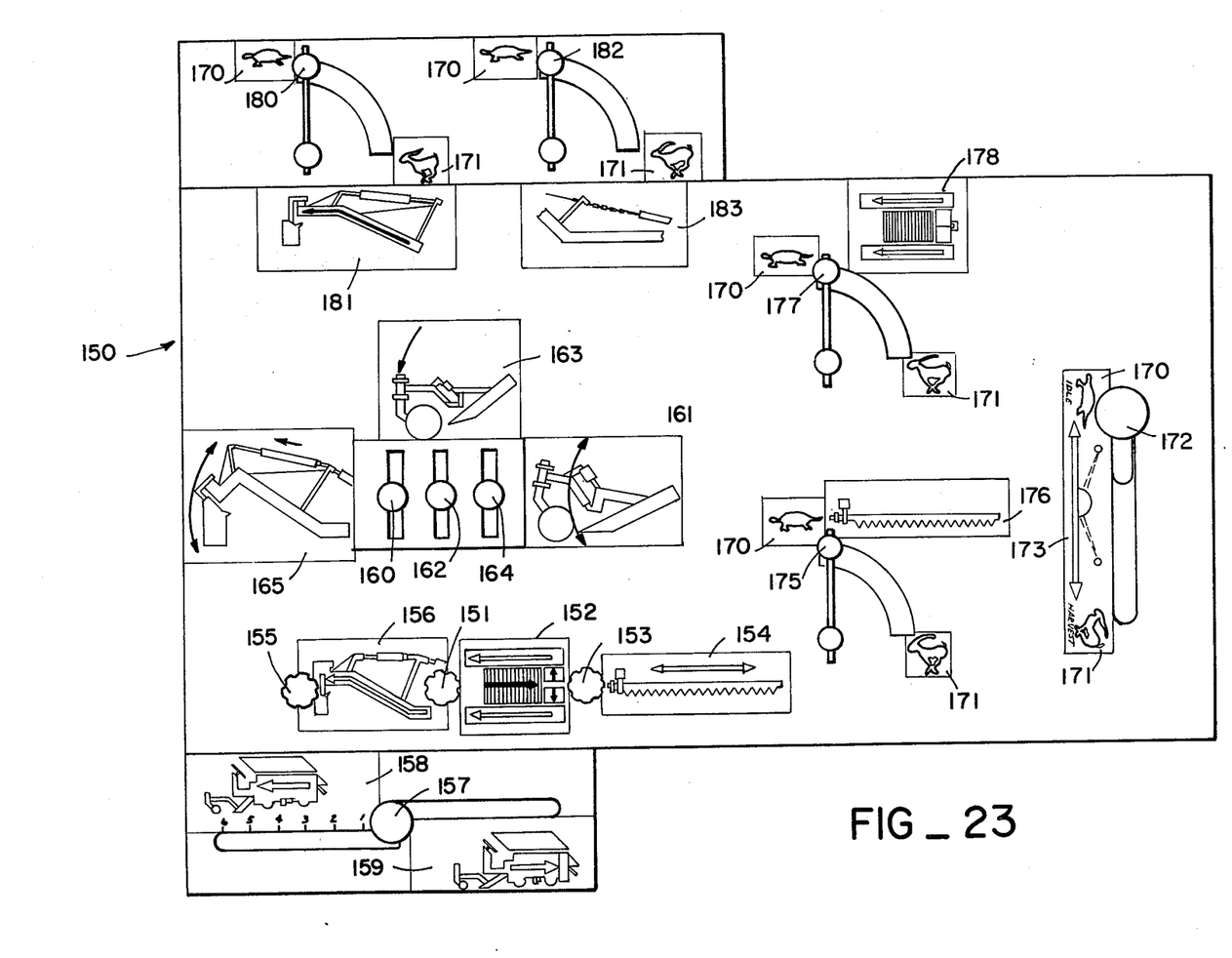
FIG. 23 is a plan view of a portion of the control panel of the harvester showing how symbols are used to enable the operator to determine what each control does.

The driver control system (FIGS. 2 and 23)

The driver controls the harvester 30 by a large number of controls which, in some cases, are handles or levers, and in other cases are wheels. In each instance, the driver should not have to rely on memory alone for what each control does and how, especially because harvesting sometimes comes for only a few brief weeks once a year and the driver may not be the same every year, nor may he remember from one season to another. Moreover, the harvester 30 is used in countries other than the country of manufacture, and to spell out words in every place would not necessarily help the operators in the locations where the machines are used.

Consequently, the present invention uses a control panel 150 with a series of symbols of two different types. One type of symbol comprises schematic drawings of the device showing actual parts being controlled and showing what happens with each of the controls. For example, on a control board 150, a control handle 151 turns on the conveyor system, as is illustrated pictorially by a pictorial diagram 152. A control handle 153 turns on the cutter bar as shown by a pictorial diagram 154; and a control handle 155 turns on the output conveyor, as shown by a pictorial diagram 156. Similarly, a control handle 157 moves to the left to move the harvester 30 forward as shown by a pictorial diagram 158, and moves to the right to move the harvester backward, as shown by a pictorial diagram 159. In similar views are a control knob 160 for moving the whole pickup assembly, including the elevator frame 35, up or down as shown in the diagram 161; a control knob 162 controls the up-down movement of the sub-frame 64, as shown in the pictorial diagram 163; and a control knob 164 controls the vertical movement of the output conveyor 165, as shown in the pictorial diagram 166. In each of these six examples, a control handle is associated with a picture that shows what the handle does. Other similar controls are on the machine, arrows accompanying the portions of the machine actually shown to show what happens with the use of the control.

Another type of symbol employed is the fast-slow control, and this is represented by a tortoise symbol 170 and a hare symbol 171—a symbol universally appreciated—shown in connection with a pictorial diagram. The direction imparting a faster speed is represented by the hare symbol 171, and by moving the control handle toward the hare symbol 171, the speed in increased. The slower operation is obtained by moving the handle in the direction toward the tortoise symbol 170. When accompanied by representation of the part of the machine so controlled, this indicates what is going on and the degree of what is being done. Thus, the language barrier is broken and better operation is obtained. Thus, the engine throttle has a control handle 172 with a simple bi-directional arrow 173 and the symbols 170 and 171 to show the speed effect of moving the handle 172. The cutter bar speed is controlled by a handle 175 and a symbol 176 for the cutter bar is associated therewith in addition to the hare and tortoise symbols 171 and 170. Another control handle 177 controls the speed of the sorter conveyors 50 and 51 as shown in the pictorial diagram 178 with the speed indicated by the symbol 170 and 171. A handle 180 controls the speed of the output conveyor 55 as shown by the symbol 183, while a handle 182 controls the speed of the front cross conveyor, as shown by a symbolic picture 183.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a row-crop harvester for tomatoes and the like having crop-severing means, crop-elevating means for picking up the severed plants and lifting them well above the ground and depositing them in a separator where the fruit is received from the stalks and leaves,
   a spinner adjacent to the forward end of said crop-elevating means in an operative relationship between said crop-severing means and said crop-elevating means, said spinner being characterized by comprising
   a central support shaft and
   a unitary molded elastomeric member molded about said shaft as a single integral member having a series of flat paddle portions extending out in respective radial planes from a central generally cylindrical core, each paddle portion being connected to the next adjacent paddle portion by a smoothly curved radius bridging portion at said core, the outer edge of each said paddle portion having a smoothly undulating edge with radius turns at each change of direction.

2. A row-crop harvester for tomatoes and the like having crop-severing means, crop-elevating means for picking up the severed plants and lifting them well above the ground, plant shaking means for shaking the lifted plants and thereby separating the fruit from the stalks and leaves, including in combination therewith
   a fruit-collecting conveyor moving lengthwise of said harvester beneath said plant-shaking means for collecting the separated fruit and conveying it, and comprising
   a pair of endless chains on opposite edges,
   a series of rods extending laterally between said chains and secured thereto,
   an identical pair of hydraulic motors, one for driving each said chain at the same rate and drivingly connected thereto,
   said motors being in series in the same hydraulic conduit system,
   a relief valve in series with said motors connected by a return line to the fluid supply for said hydraulic conduit system, and
   means in said return line for actuating an alarm system upon the pressure in said return line reaching a predetermined value.

* * * * *